United States Patent [19]
Baker et al.

[11] 3,789,693
[45] Feb. 5, 1974

[54] RESILIENTLY BIASED CONTROL LINKAGE

[75] Inventors: John R. Baker, Livonia; George Fox, Dearborn, both of Mich.

[73] Assignee: Ford Motor Company, Dearborn, Mich.

[22] Filed: July 17, 1972

[21] Appl. No.: 272,505

[52] U.S. Cl. .................................................. 74/513
[51] Int. Cl. ............................................ G05g 1/14
[58] Field of Search.. 74/513, 539, 512; 267/71, 72, 267/170, 173

[56] References Cited
UNITED STATES PATENTS
3,308,678  3/1967  Walker ............................. 74/513 X
3,063,526  11/1962  Griffin ............................. 74/513 X Primary Examiner—Leonard H. Gerin
Assistant Examiner—Frank H. McKenzie, Jr.

[57] ABSTRACT

A control linkage or mechanism suitable for interconnecting a motor vehicle carburetor throttle and an accelerator pedal. The linkage includes a throttle lever, an accelerator lever and a connecting link joining the levers. A compression spring and a second link cooperate with the throttle lever and the connecting link to resiliently urge the throttle lever toward a closed position without the need for reaction brackets or spring connections external to the linkage.

7 Claims, 4 Drawing Figures

Patented Feb. 5, 1974

3,789,693

RESILIENTLY BIASED CONTROL LINKAGE

BACKGROUND AND SUMMARY OF THE INVENTION

In an automotive vehicle the carburetor throttle plate is connected to the accelerator pedal generally by a pin jointed linkage or a Bowden wire. A tension or compression spring, acting between a reaction bracket mounted on a fixed portion of the engine or engine compartment and the movable linkage or wire, biases the linkage or wire and the throttle plate toward closed throttle positions. The spring is generally supplemented by a coil spring positioned about the throttle shaft and acting between the throttle lever and the carburetor housing.

This invention provides an inherently resiliently biased throttle linkage which is self-contained and requires no external bracketing between the linkage and the engine. Furthermore, the invention provides a throttle linkage which employs a compression spring rather than a tension spring. The invention also provides a resiliently biased throttle linkage which is more nearly universal than prior art linkages and eliminates the need for a plurality of reaction brackets designed particularly for a specific engine-vehicle combination. Finally, the invention provides a resiliently biased throttle linkage which is reliable in operation and economical to produce and install in a motor vehicle.

A control linkage constructed in accordance with this invention includes a first lever constructed to pivot about a first fixed axis and a second lever constructed to pivot about a second fixed axis. The first axis intersects the first lever at a point in an intermediate portion of the lever. A first link joins the first lever to the second lever at points spaced from the first and second axes, respectively. A spring biased slider is mounted on the connecting link. A second link connects the slider and the first lever at a point on the opposite end of the lever at its connection with the first link, so that the pivot axis of the first lever is intermediate the connection with the first link and the connection with the second link. As the levers are displaced in one direction, the spring is compressed, urging a return to the initial position.

DETAILED DESCRIPTION

Figure 1:
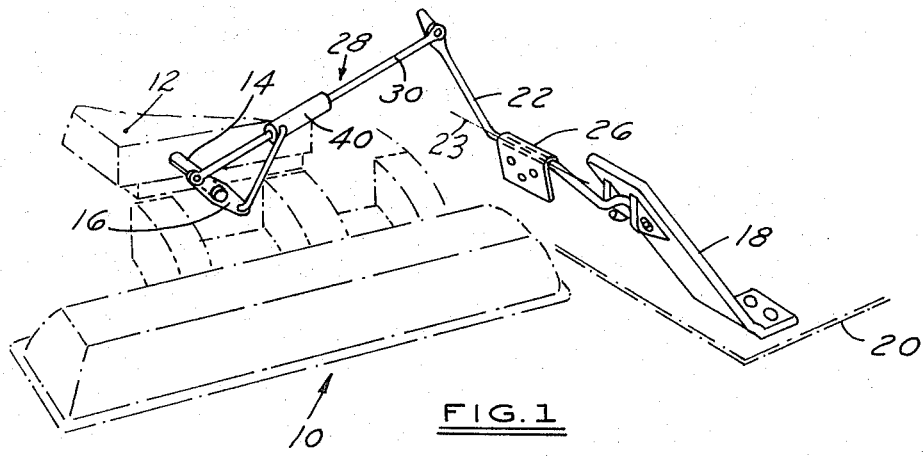
FIG. 1 is a perspective view of a portion of an automotive vehicle and engine showing the accelerator pedal and the throttle linkage and its connection with a portion of the carburetor.

A portion 10 of an internal combustion engine includes a carburetor 12 having a throttle shaft 14 extending therefrom onto which is secured a throttle lever 16. The throttle lever is pivotable about the axis of the throttle shaft 14 to open and close a throttle plate (not shown). An accelerator pedal 18 is hinged to the floor 20 of the vehicle cab and is displaceable fore and aft to move the accelerator lever 22 about pivot axis 23. The accelerator lever 22 is pivotally retained to the vehicle fire wall 24 by a bracket 26. Interconnecting accelerator lever 22 and throttle lever 16 is a linkage assembly referred to generally by numeral 28.

Figure 2:
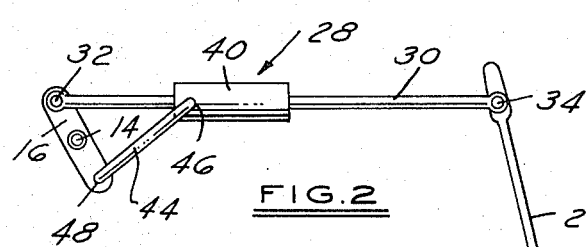
FIG. 2 is a transverse elevational view of the linkage showing the elements of the linkage and the pedal in idling positions.
Figure 4:
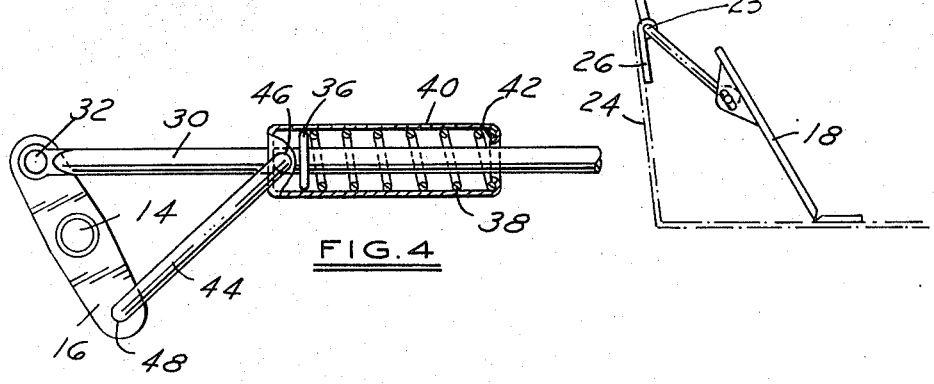
FIG. 4 is a transverse elevational view with a section broken away of a portion of the linkage incorporating a compression spring.
Figure 3:
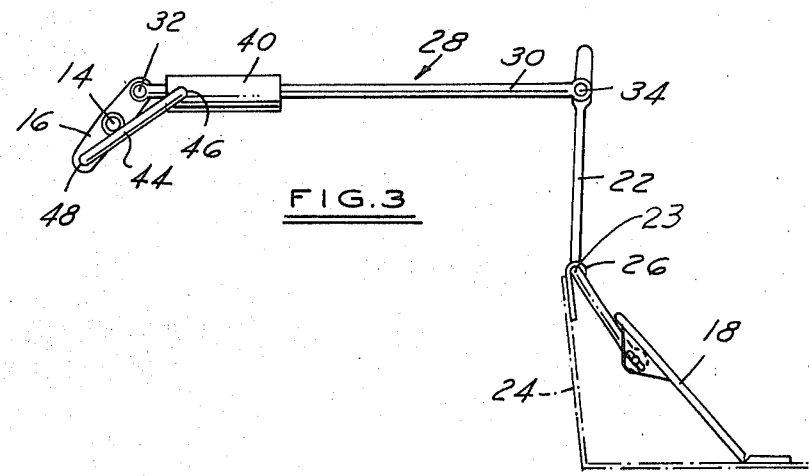
FIG. 3 is a transverse elevational view of the linkage showing the elements of the linkage and the pedal in wide open throttle positions.

The linkage assembly 28 includes a first link 30 pivotally connected to throttle lever 16 and accelerator lever 22 by connections 32 and 34, respectively. Connections 32 and 34 are spaced from the pivot axis of shaft 14 and axis 23, respectively. An abutment 36 is formed at an intermediate position on link 30. A coiled compression spring 38 engages at one end the abutment 36 and extends about a portion of link 30 toward the connection 34 with the accelerator lever. A slider or slidable shroud 40 is positioned about the compression spring and has an abutment means 42 which engages the other end of the compression spring 38. A second link 44 is pivotally connected to the shroud at 46 and to the throttle lever at 48. The point of attachment 48 to the throttle lever 16 is on a portion of the lever extending in generally the opposite direction from the pivot axis of the shaft 14 as that portion of the lever containing connection 32. As the accelerator pedal 18 is depressed and accelerator lever 22 moves clockwise from the relative positions of FIG. 2 to the positions of FIG. 3, link 30 displaces the throttle lever 16 clockwise. Consequently, connection 32 is displaced generally rightwardly, connection 48 is displaced generally leftwardly and the spring 36 is increasingly compressed between abutments 36 and 42. In FIG. 3, the linkage elements are in wide open throttle positions and spring 36 is fully compressed, resiliently urging the linkage elements toward the closed throttle positions of FIG. 2.

In the event of a failure of compression spring 36, the entire spring force is not lost, but only that portion of the compression force depending upon the displacement distance between adjacent coils of the spring where the failure occurred.

It may thus be seen that this invention provides an inherently resiliently biased throttle linkage that requires no external bracketing or connections to the engine or engine compartment other than the throttle lever 16 and the accelerator lever 22. Furthermore, the linkage incorporates features of an enclosed compression spring in the event of spring failure.

Modifications and alterations will occur to those skilled in the art which are included within the scope of the following claims.

We claim:
1. A control mechanism comprising:
   a first lever,
   a second lever,
   a solid link interconnecting said first lever and said second lever to transmit motion therebetween,
   a compression spring having one end fixed relative to said link,
   means engaging the other end of said spring causing compression of said spring when one of said levers is displaced in one direction.
2. A control mechanism comprising
   a first lever constructed to pivot about a first fixed axis, a second lever constructed to pivot about a second fixed axis, linkage means interconnecting said first lever and said second lever, said linkage means including a first solid link pivotally attached to said first lever and said second lever at points spaced from the pivot axes of said first lever and said second lever, respectively, a compression spring having one end fixed relative to said solid link, a second link having one end fixed relative to the other end of said spring, said second link being pivotally connected to one of said levers at a point spaced from the axis of said one lever in a direction opposite the first link connection, whereby movement of one of said levers in one direction compresses said spring and movement in the opposite direction releases the compression of said spring.

3. A control mechanism according to claim 2, said compression spring being positioned about said first link, abutment means on said solid link engaging said one end of said compression spring, slider means engaging the other end of said compression spring and longitudinally displaceable relative to said first link to compress and relieve compression of said spring, said second link being pivotally attached to slider means.

4. A control mechanism according to claim 3, said slider means comprising a cylindrical shroud positioned about said compression spring, said shroud having an abutment at one end engaging said other end of said spring, said shroud having a second abutment at the other end engageable with said abutment means on said first link when the compression spring is in a fully extended condition.

5. A throttle plate control linkage for an automotive vehicle comprising an accelerator pedal lever constructed to pivot about a first axis in response to an input from the vehicle operator, a throttle lever fixed to a shaft carrying the throttle plate, a first link interconnecting said first and second levers, connecting means pivotally joining said first link to said first lever at a point spaced from said first axis and said first link to said second lever at a point spaced from said second axis, a compression spring positioned about said first link having one end fixed relative thereto, a second link having one end pivotally connected to said second lever at a point spaced from said first axis in generally the opposite direction of the point of pivotal connection of said first link and said throttle lever, the other end of said second link being connected to the other end of said compression spring to move therewith, displacement of said first lever in one direction causing said compression spring to be compressed.

6. A throttle plate control linkage according to claim 5, slider means fixed relative to said other end of the compression spring and movable relative to said first link in the longitudinal direction thereof, said slider means interconnecting said other end of the second link and said other end of the compression spring.

7. A throttle plate control linkage according to claim 6, said slider means comprising a cylindrical shroud positioned about said compression spring, said shroud having an abutment at one end engaging said other end of said spring, said shroud having a second abutment at the other end engageable with said abutment means on said first link when the compression spring is in a fully extended condition.

* * * * *